United States Patent
Zhang et al.

(10) Patent No.: US 10,284,612 B2
(45) Date of Patent: May 7, 2019

(54) MEDIA QUALITY INFORMATION SIGNALING IN DYNAMIC ADAPTIVE VIDEO STREAMING OVER HYPERTEXT TRANSFER PROTOCOL

(71) Applicant: Futurewei Technologies, Inc., Plano, TX (US)

(72) Inventors: Shaobo Zhang, Shenzhen (CN); Xin Wang, Rancho Palos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 885 days.

(21) Appl. No.: 14/256,607

(22) Filed: Apr. 18, 2014

(65) Prior Publication Data
US 2014/0317308 A1 Oct. 23, 2014

Related U.S. Application Data

(60) Provisional application No. 61/814,069, filed on Apr. 19, 2013.

(51) Int. Cl.
*G06F 15/16* (2006.01)
*H04L 29/06* (2006.01)
(Continued)

(52) U.S. Cl.
CPC ...... *H04L 65/4069* (2013.01); *H04L 65/4084* (2013.01); *H04L 65/4092* (2013.01);
(Continued)

(58) Field of Classification Search
CPC ............. H04L 65/4069; H04L 65/4084; H04L 65/4092; H04L 65/80; H04L 65/607;
(Continued)

(56) References Cited

U.S. PATENT DOCUMENTS

| 7,536,681 B2 * | 5/2009 | Nagendra ........... G06F 17/2229 |
| | | 717/136 |
| 8,464,066 B1 | 6/2013 | Price et al. |

(Continued)

FOREIGN PATENT DOCUMENTS

| CN | 101842786 A | 9/2010 |
| CN | 102291373 A | 12/2011 |

(Continued)

OTHER PUBLICATIONS

"3rd Generation Partnership Project; Technical Specification Group Services and Systems Aspects; Transparent end-to-end Packet switched streaming service (PSS); Timed text format (Release 10)," 3GPP TS 26.245, V10.0.0, Mar. 2011, 18 pages.

(Continued)

*Primary Examiner* — Moustafa M Meky
(74) *Attorney, Agent, or Firm* — Conley Rose P.C.

(57) ABSTRACT

A media representation adaptation method comprising obtaining an media presentation description (MPD) that comprises instructions for retrieving a plurality of media segments and their quality information, sending a quality information request, receiving the quality information that comprises a plurality of quality segments, selecting a media segment based on the quality information, sending a media segment request that requests the media segment, and receiving the media segment. A computer program product that when executed by a processor causes a network device to obtain an MPD that comprises instructions for retrieving a media content stream and quality information, determine a quality level threshold, request a quality information associated with the media content stream, receive the quality information, select a media segment with a corresponding quality segment that is greater than the quality level thresh- (Continued)

old, send a media segment request that requests the media segment, and receive the media segment.

24 Claims, 6 Drawing Sheets

(51) Int. Cl.
  *H04N 21/262*  (2011.01)
  *H04N 21/6373*  (2011.01)
  *H04N 21/845*  (2011.01)
  *H04N 21/2343*  (2011.01)
  *H04N 21/442*  (2011.01)
  *H04N 21/647*  (2011.01)

(52) U.S. Cl.
  CPC ....... *H04L 65/80* (2013.01); *H04N 21/26258* (2013.01); *H04N 21/6373* (2013.01); *H04N 21/8456* (2013.01); *H04L 65/607* (2013.01); *H04N 21/23439* (2013.01); *H04N 21/44209* (2013.01); *H04N 21/647* (2013.01)

(58) Field of Classification Search
  CPC ......... H04N 21/26258; H04N 21/6373; H04N 21/8456; H04N 21/23439; H04N 21/44209; H04N 21/647
  See application file for complete search history.

(56) References Cited

U.S. PATENT DOCUMENTS

| | | | |
|---|---|---|---|
| 9,125,073 B2 * | 9/2015 | Oyman | H04W 24/04 |
| 9,246,842 B2 * | 1/2016 | Oyman | H04W 24/06 |
| 9,516,375 B2 * | 12/2016 | Aloni | H04N 21/23436 |
| 9,674,266 B2 * | 6/2017 | Andersson | H04L 67/06 |
| 2003/0049014 A1 | 3/2003 | Siddiqui | |
| 2005/0076136 A1 * | 4/2005 | Cho | H04L 29/06027 709/231 |
| 2006/0218527 A1 | 9/2006 | Nagendra | G06F 17/2229 717/117 |
| 2007/0106760 A1 | 5/2007 | Houh et al. | |
| 2007/0136522 A1 * | 6/2007 | Umemura | H04N 5/781 711/113 |
| 2007/0268836 A1 | 11/2007 | Byun et al. | |
| 2009/0055417 A1 | 2/2009 | Hannuksela et al. | |
| 2009/0119594 A1 | 5/2009 | Hannuksela | |
| 2009/0164564 A1 | 6/2009 | Willis | |
| 2009/0183210 A1 | 7/2009 | Andrade | |
| 2009/0187593 A1 * | 7/2009 | Chen | G06F 17/30029 |
| 2009/0300204 A1 | 12/2009 | Zhang et al. | |
| 2009/0323926 A1 | 12/2009 | Shaham et al. | |
| 2010/0099350 A1 | 4/2010 | Seder et al. | |
| 2010/0138646 A1 * | 6/2010 | Aloni | H04N 21/2343 713/150 |
| 2010/0189183 A1 | 7/2010 | Gu et al. | |
| 2011/0082914 A1 | 4/2011 | Robert et al. | |
| 2011/0096828 A1 * | 4/2011 | Chen | H04N 21/23106 375/240.02 |
| 2011/0119394 A1 | 5/2011 | Wang et al. | |
| 2011/0119395 A1 | 5/2011 | Ha et al. | |
| 2011/0202270 A1 * | 8/2011 | Sharma | G06Q 30/02 701/533 |
| 2011/0211629 A1 | 9/2011 | Gustafsson et al. | |
| 2011/0213681 A1 * | 9/2011 | Shahid | G06Q 30/02 705/27.1 |
| 2011/0231519 A1 * | 9/2011 | Luby | H04N 21/23106 709/219 |
| 2011/0231569 A1 * | 9/2011 | Luby | H04N 21/23106 709/234 |
| 2011/0238789 A1 * | 9/2011 | Luby | H04N 21/23106 709/219 |
| 2011/0239078 A1 * | 9/2011 | Luby | H04N 21/23106 714/752 |
| 2011/0270913 A1 | 11/2011 | Jarnikov | |
| 2011/0274361 A1 | 11/2011 | Bovik et al. | |
| 2011/0307545 A1 | 12/2011 | Bouazizi | |
| 2011/0307581 A1 | 12/2011 | Furbeck et al. | |
| 2012/0023155 A1 | 1/2012 | Myers et al. | |
| 2012/0023253 A1 | 1/2012 | Rhyu et al. | |
| 2012/0038782 A1 | 2/2012 | Messmer et al. | |
| 2012/0042050 A1 | 2/2012 | Chen et al. | |
| 2012/0042090 A1 | 2/2012 | Chen et al. | |
| 2012/0124179 A1 | 5/2012 | Cappio et al. | |
| 2012/0141089 A1 | 6/2012 | Hunt | |
| 2012/0203867 A1 | 8/2012 | Furbeck | |
| 2012/0221681 A1 * | 8/2012 | Yuan | H04L 65/4084 709/217 |
| 2013/0007223 A1 * | 1/2013 | Luby | H04N 21/23106 709/219 |
| 2013/0036234 A1 * | 2/2013 | Pazos | H04L 12/189 709/231 |
| 2013/0042015 A1 | 2/2013 | Begen et al. | |
| 2013/0103642 A1 | 4/2013 | Zhang | |
| 2013/0286868 A1 * | 10/2013 | Oyman | H04W 24/06 370/252 |
| 2013/0290493 A1 | 10/2013 | Oyman et al. | |
| 2014/0019593 A1 | 1/2014 | Reznik et al. | |
| 2014/0036656 A1 | 2/2014 | Chou et al. | |
| 2014/0040498 A1 * | 2/2014 | Oyman | H04W 24/04 709/231 |
| 2014/0122738 A1 | 5/2014 | Thang et al. | |
| 2014/0201324 A1 * | 7/2014 | Zhang | H04L 65/4084 709/217 |
| 2014/0201382 A1 | 7/2014 | Shivadas et al. | |
| 2014/0219088 A1 * | 8/2014 | Oyman | H04N 21/23439 370/231 |
| 2014/0304377 A1 * | 10/2014 | Andersson | H04L 65/1083 709/219 |
| 2015/0120819 A1 * | 4/2015 | Zhang | H04L 65/601 709/203 |
| 2015/0378998 A1 * | 12/2015 | Houh | G06F 17/30746 707/706 |
| 2016/0044099 A1 * | 2/2016 | Oyman | H04W 4/70 709/219 |
| 2016/0050246 A1 * | 2/2016 | Liao | H04L 5/0085 709/219 |
| 2016/0057489 A1 | 2/2016 | He et al. | |
| 2017/0134356 A1 * | 5/2017 | Oyman | H04L 63/126 |
| 2018/0035450 A1 * | 2/2018 | Oyman | H04W 52/0251 |
| 2018/0069856 A1 * | 3/2018 | Oyman | H04N 21/23439 |

FOREIGN PATENT DOCUMENTS

| | | |
|---|---|---|
| CN | 102687518 A | 9/2012 |
| CN | 103081504 A | 5/2013 |
| EP | 2410745 A1 | 1/2012 |
| EP | 2965529 A2 | 1/2016 |
| JP | 2013538508 A | 10/2013 |
| JP | 2014506748 A | 3/2014 |
| JP | 2015527809 A | 9/2015 |
| JP | 2015531186 A | 10/2015 |
| JP | 2016517197 A | 6/2016 |
| WO | 2011039614 A1 | 4/2011 |
| WO | 2011047335 A1 | 4/2011 |
| WO | 2011070552 A1 | 6/2011 |
| WO | 2011121083 A1 | 10/2011 |
| WO | 2012100215 A1 | 7/2012 |
| WO | 2012109520 A1 | 8/2012 |
| WO | 2012134530 A1 | 10/2012 |
| WO | 2014138331 A1 | 9/2014 |

OTHER PUBLICATIONS

Stockhammer, T., "Dynamic Adaptive Streaming over HTTP—Standards and Design Principles," MMSys, Feb. 23-25, 2011, 11 pages.

Office Action dated Jun. 7, 2017, 42 pages, U.S. Appl. No. 14/335,519, filed Jul. 18, 2014.

"Information Technology—Dynamic Adaptive Streaming over HTTP

(56) References Cited

OTHER PUBLICATIONS (DASH)—Part 1: Media Presentation Description and Segment Formats," International Standard, ISO/IEC 23009-1, First Edition, Apr. 1, 2012, 134 pages.

"Information Technology—MPEG Systems Technologies—Part 10: Carriage of Timed Metadata of Media in ISO Base Media File Format," ISO/IEC JTC 1/SC 29 N, ISO/IEC CD 23001-10, ISO/IEC JTC 1/SC 291WG 11, Jan. 17, 2014, 23 pages.

"Information Technology—Dynamic Adaptive Streaming Over HTTP (DASH)—Part 1: Media Presentation Description and Segment Formats / Amd 2," ISO/IEC JTC1/SC 29 N 14443, ISO/IEC 23009-1:201x/PDAM2, ISO/IEC JTC 1/SC 29/WG 11, Apr. 11, 2014, 16 pages.

"Information Technology—Coding of Audio-Visual Objects—Part 12: ISO Base Media File Format," International Standart, ISO/IEC 14496-12, 4th Edition, 2012, 190 pages.

Zhang, S., et al., "Signalling of Media Quality Related Information For DASH," International Organisation for Standardisation, ISO/IEC JTC/SC29/WG11, MPEG2013/m2xxxx, Incheon, Korea, Apr. 2013, 4 pages.

Reznik, Y., A., "Proposed Test Sequences and Framework for DASH on Quality Signaling Contribution," International Organisation for Standardization, ISO/IEC/SC9/WG11, MPEG2012/m25996, Shanghai China, Oct. 14, 2012, 5 pages.

Reznik, Y., et al., "ISO/IEC 23001-10 CD: Carriage of Timed Metadata Metrics of Media in ISO Based Media File Format," ISO/IEC JTC1/SC29/WG11, MPEG2014/N14129, San Jose, USA, Jan. 2014, 10 pages.

Zhang, S., et al.,"In Band Signalling for Quality Driven Adaptation," International Organisation for Standardisation, ISO/IEC JTC1/CN29,WG11, MPEG2013/m28168, Geneva, Switzerland, Jan. 2013, 4 pages.

Zhang, S., et al., "Experiment Results on Quality Driven Streaming," International Organization for the Standardisation, ISO/IEC JTC1/SC29/WG11, MPEG2013/m28172, Geneva, Switzerland, Jan. 2013, 12 pages.

Giladi, A., et al., "Descriptions of Core Experiments," International Organisation for Standardisation, ISO/IEC JTC1/SC29/WG11, MPEG2013/N13286, Geneva, Switzerland, Jan. 2013, 36 pages.

Bray, T., et al., "Extensible Markup Language (XML) 1.0 (Fifth Edition)," W3C Recommendation, Nov. 26, 2008, 37 pages.

Zhang, Shaobo, et al., U.S. Appl. No. 61/752,796; "System and Method for In-Band Signaling of Segment Quality for Smooth Adaptive Streaming," Filed Jan. 15, 2013, 14 pages.

Zhang, Shaobo., et al., U.S. Appl. No. 61/752,831, "System and Method for Out-of-Band Signaling of Quality Information," Filed Jan. 15, 2013, 18 pages.

Foreign Communication From a Counterpart Application, PCT Application No. PCT/US2014/034675, International Search Report dated Jul. 22, 2014, 5 pages.

Foreign Communication From a Counterpart Application, PCT Application No. PCT/US2014/034675, Written Opinion dated Jul. 22, 2014, 11 pages.

Zhang, S., et al., "Out of Band Signalling for Quality Driven Adaptation," ISO/IEC JTC1/SC29/WG11, MPEG2013/m28169, Jan. 2013, 3 pages.

"Information Technology—Generic Coding of Moving Pictures and Associated Audio Information: Systems," ISO/IEC 13818-1, Second Edition, Dec. 1, 2000, 174 pages.

"Information Technology—MPEG Systems Technologies—Part 10: Carnage of Timed Metadata Metrics of Media in ISO Base Media File Format," ISO/IEC JTC 1/SC 29 N, ISO/IEC CD 23001-10; ISO/IEC JTC 1/SC 29/2G 11, Jan. 17, 2014, 23 pages.

Song, J., et al., "Response to Call for Proposals for HTTP Streaming of MPEG Media standard," ISO/IEC JTC1/SC29/WG11 MPEG2010/M17779, Jul. 26, 2010, 60 pages.

Nokia Corporation, "Fragmented Time Indexing of Representations," 3GPP TSG-SA4 Ad-Hoc Meeting, S4- AHI126, Dec. 14-16, 2009, 4 pages.

Thang, T., et al., "Adaptive Streaming of Audiovisual Content using MPEG Dash," IEEE Transactions on Consumer Electronics, vol. 57, No. 1, Feb. 2012, pp. 78-85.

"Universal Mobile Telecommunications System (UMTS); LTE; Transparent end-to-end Packet-switched Streaming Service (PSS); Progressive Download and Dynamic Adaptive Streaming over HTTP (3GP-Dash) (3GPP TS 26.247 version 10.2.0 Release 10)," ETSI TS 126 247, V10.2.0, Jul. 2012, 112 pages.

"DASH Evaluation Experiment #2: MPD Modification, Corrections, and Extension," ISO/IEC JTC1/SC29/WG11 MPEG2010/M18010, Sep. 2010, 22 pages.

"Liaison Response on DASH," ISO/IEC JTC1/SC29/WG11 N12065, Jul. 2011, TSG-SA4#66 meeting, Tdoc S4 (11) 0852, Nov. 7-11, 2011, 1 page.

Foreign Communication From A Counterpart Application, PCT Application No. PCT/US2014/047249, International Search Report dated Nov. 13, 2014, 7 pages.

Foreign Communication From A Counterpart Application, PCT Application No. PCT/US2014/047249, Written Opinion dated Nov. 13, 2014, 12 pages.

Foreign Communication From A Counterpart Application, PCT Application No. PCT/US2014/011706, International Search Report dated Jun. 23, 2014, 2 pages.

Foreign Communication From A Counterpart Application, PCT Application No. PCT/US2014/011706, Written Opinion dated Jun. 23, 2014, 6 pages.

Foreign Communication From A Counterpart Application, Japanese Application No. 2016-512119, Japanese Notice of Allowance dated Nov. 22, 2016, 4 pages.

Foreign Communication From A Counterpart Application, European Application No. 14741032.8, Extended European Search Report dated Oct. 22, 2015, 7 pages.

Office Action dated Mar. 24, 2016, 25 pages, U.S. Appl. No. 14/335,519, filed Jul. 18, 2014.

Office Action dated Nov. 18, 2016, 21 pages, U.S. Appl. No. 14/335,519, filed Jul. 18, 2014.

Foreign Communication From A Counterpart Application, Chinese Application No. 201480022359.7, Chinese Search Report dated Dec. 28, 2017, 2 pages.

Foreign Communication From A Counterpart Application, Chinese Application No. 201480022359.7, Chinese Office Action dated Jan. 4, 2018, 6 pages.

Office Action dated May 21, 2018, 53 pages, U.S. Appl. No. 14/335,519, filed Jul. 18, 2014.

Foreign Communication From A Counterpart Application, Chinese Application No. 201480028840.7, Chinese Search Report dated Oct. 16, 2017, 3 pages.

Foreign Communication From A Counterpart Application, Chinese Application No. 201480028840.7, Chinese Office Action dated Nov. 3, 2017, 7 pages.

\* cited by examiner

MEDIA QUALITY INFORMATION SIGNALING IN DYNAMIC ADAPTIVE VIDEO STREAMING OVER HYPERTEXT TRANSFER PROTOCOL

CROSS-REFERENCE TO RELATED APPLICATIONS

The present application claims benefit of U.S. Provisional Patent Application No. 61/814,069 filed Apr. 19, 2013 by Shaobo Zhang, et al. and entitled, "Method And System For Signaling of Media Quality Related Information in Dynamic Adaptive Streaming," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provide or distributor may deliver various media content to subscribers or users using different encryption and/or coding schemes suited for different devices (e.g., televisions, notebooks computers, desktop computers, and mobile handsets). Dynamic adaptive streaming over hypertext transfer protocol (HTTP) (DASH) defines a manifest format, media presentation description (MPD), and segment formats for International Organization for Standardization (ISO) Base Media File Format (ISO-BMFF) and Moving Picture Expert Group (MPEG) Transport Stream under the family of standards MPEG-2, as described in ISO/International Electrotechnical Commission (IEC) 13818-1, titled "Information Technology—Generic Coding of Moving Pictures and Associated Audio Information: Systems."

A conventional DASH system, may require multiple bitrate alternatives of media content or representations to be available on a server. The alternative representations may be encoded versions in constant bit rate (CBR) or variable bit rate (VBR). For CBR representations, the bitrate may be controlled and may be about constant, but the quality may fluctuate significantly unless the bit rate is sufficiently high. Changing content, such as switching sports/static scenes in news channels may be difficult for video encoders to deliver consistent quality while producing a bitstream that has a certain specified bitrate. For VBR representations, higher bitrates may be allocated to the more complex scenes while fewer bits may be allocated to less complex scenes.

Additionally, the available bandwidth may be constantly changing which may be a challenge for streaming media content. Conventional adaptation schemes, may be configured to adapt to a device's capabilities (e.g., decoding capability or display resolution) or a user's preference (e.g., language or subtitle). In a conventional DASH system, an adaptation to the changing available bandwidth may be enabled by switching between alternative representations having different bitrates. The bitrates of representations or segments may be matched to the available bandwidth. However, the bitrate of a representation may not directly correlate to the quality of the media content. A bitrate may express the relative qualities of multiple representations or segments and may not provide information about the quality of a segment. For example, a high quality level can be encoded with low bitrate for scenes (e.g., low spatial complexity or low motion level) or a low quality level can be encoded with high bitrate scenes, for the same bitrate. Thus, bandwidth fluctuations cause a relatively low quality of experience for the same bitrate. Bandwidth may also be wasted when a relatively high bandwidth is unused or not needed. Aggressive bandwidth consumption may also result in limiting the number of users that can be supported, high bandwidth spending, and/or high power consumption.

SUMMARY

In one embodiment, the disclosure includes a media representation adaptation method comprising obtaining an MPD that comprises instructions for retrieving a plurality of media segments and their quality information, sending a quality information request in accordance with the instructions provided in the MPD, receiving the quality information that comprises a plurality of quality segments that corresponds to the plurality of media segments, selecting a media segment based on the quality information, sending a media segment request that requests the media segment, and receiving the media segment in response to the media segment request.

In another embodiment, the disclosure includes a computer program product comprising computer executable instructions stored on a non-transitory computer readable medium that when executed by a processor causes a network device to obtain a DASH MPD that comprises instructions for retrieving a media content stream and quality information associated with the media content stream, determine a quality level threshold for a media content stream, request a quality information associated with the media content stream, receive the quality information associated with the media content stream, select a media segment with a corresponding quality segment that is greater than the quality level threshold, send a media segment request that requests the media segment, and receive the media segment.

In yet another embodiment, the disclosure includes an apparatus for media representation adaptation according to an MPD that comprises information for retrieving a plurality of media segments and their metadata information, comprising a memory, and a processor couple to the memory, wherein the memory includes instructions that when executed by the processor cause the apparatus to receive a metadata information request in accordance with the MPD, send a metadata information that comprises quality information, receive a media segment request that requests a media segment, and send the media segment in accordance with the MPD.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for communicating and signaling quality information for representation adaptation in a DASH system. In particular, a DASH client may use metadata information of media segments to obtain quality information used to make representation adaptation decisions. The metadata information may signal metadata on a segment or subsegment level to efficiently support live and/or on-demand services. The metadata may be retrieved independently before one or more associated media segments are requested. Metadata may be provided with other access information (e.g., subsegment size or duration) which may reduce the need for cross-referencing to correlate bitrate information and quality information. An adaptation decision using the metadata information may reduce quality fluctuations of streamed content, may improve the quality of experience, and may use bandwidth more efficiently. Metadata information may be used or generated conditionally and may not impact the operation of streaming media data.

Figure 1:
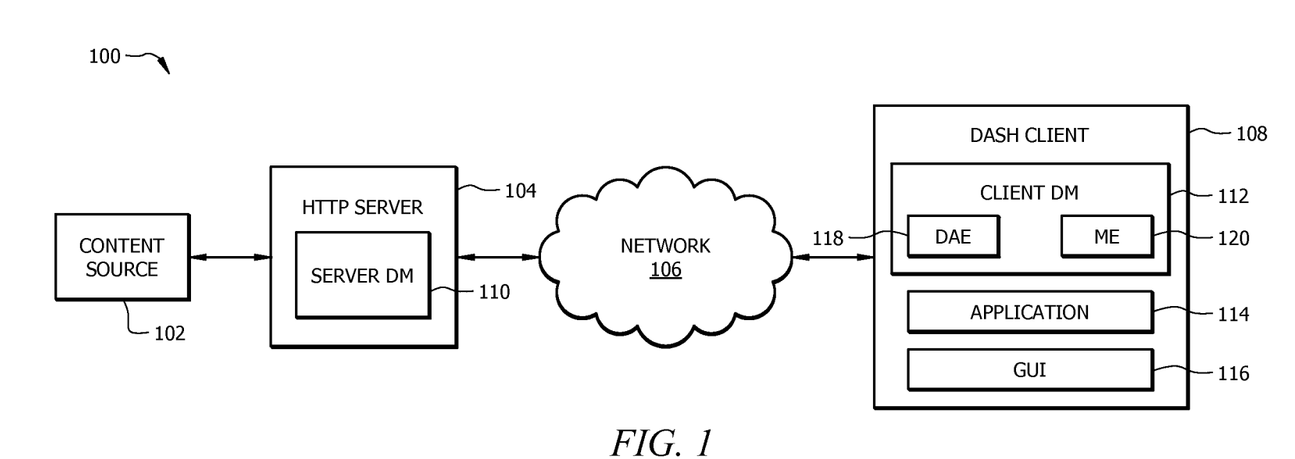
FIG. 1 is a schematic diagram of an embodiment of a DASH system.

FIG. 1 is a schematic diagram of an embodiment of a DASH system 100. The DASH system 100 may generally comprise a content source 102, an HTTP Server 104, a network 106, and one or more DASH clients 108. In such an embodiment, the HTTP server 104 and the DASH client 108 may be in data communication with each other via the network 106. Additionally, the HTTP server 104 may be in data communication with the content source 102. Alternatively, the DASH system 100 may further comprise one or more additional content sources 102 and/or HTTP servers 104. The network 106 may comprise any network configured to provide data communication between the HTTP server 104 and the DASH client 108 along wired and/or wireless channels. For example, the network 106 may be an Internet or mobile telephone network. Descriptions of the operations performed by the DASH system 100 may generally refer to instances of one or more DASH clients 108. It is noted that the use of the term DASH throughout the disclosure may include any adaptive streaming, such as HTTP Live Streaming (HLS), Microsoft Smooth Streaming, or Internet Information Services (IIS), and may not be constrained to represent only third generation partnership (3GP)-DASH or moving picture experts group (MPEG)-DASH.

The content source 102 may be a media content provider or distributer which may be configured to deliver various media contents to subscribers or users using different encryption and/or coding schemes suited for different devices (e.g., television, notebook computers, and/or mobile handsets). The content source 102 may be configured to support a plurality of media encoders and/or decoders (e.g., codecs), media players, video frame rates, spatial resolutions, bitrates, video formats, or combinations thereof. Media content may be converted from a source or original presentation to various other representations to suit different users.

The HTTP server 104 may be any network node, for example, a computer server that is configured to communicate with one or more DASH clients 108 via HTTP. The HTTP server 104 may comprise a server DASH module (DM) 110 configured to send and receive data via HTTP. In one embodiment, the HTTP server 104 may be configured to operate in accordance with the DASH standard described in ISO/IEC 23009-1, entitled, "Information Technology—Dynamic Adaptive Streaming over HTTP (DASH)—part 1: Media Presentation Description and Segment Formats," which is incorporated herein by reference as if reproduced in its entirety. The HTTP server 104 may be configured to store media content (e.g., in a memory or cache) and/or to forward media content segments. Each segment may be encoded in a plurality of bitrates and/or representations. The HTTP server 104 may form a portion of a content delivery network (CDN), which may refer to a distribution system of servers deployed in multiple data centers over multiple backbones for the purpose of delivering content. A CDN may comprise one or more HTTP servers 104. Although FIG. 1 illustrates an HTTP server 104, other DASH servers, such as, origin servers, web servers, and/or any other suitable type of server may store media content.

A DASH client 108 may any network node, for example, a hardware device that is configured to communicate with the HTTP server 104 via HTTP. A DASH client 108 may be a notebook computer, a tablet computer, a desktop computer, a mobile telephone, or any other device. The DASH client 108 may be configured to parse an MPD to retrieve information regarding the media content, such as timing of the program, availability of media content, media types, resolutions, minimum and/or maximum bandwidths, existence of various encoded alternatives of media components, accessibility features and required digital right management (DRM), location of each media component (e.g., audio data segments and video data segments) on the network, and/or other characteristics of the media content. The DASH client 108 may also be configured to select an appropriate encoded version of the media content according to the information retrieved from the MPD and to stream the media content by fetching media segments located on the HTTP server 104. A DASH client 108 may comprise a client DM 112, an application 114, and a graphical user interface (GUI) 116. The client DM 112 may be configured to send and receive data via HTTP and a DASH protocol (e.g., ISO/IEC 23009-1). The client DM 112 may comprise a DASH access engine (DAE) 118 and a media output (ME) 120. The DAE 118 may be configured as the primary component for receiving raw data from the HTTP server 104 (e.g., the server DM 110) and constructing the data into a format for viewing. For example, the DAE 118 may format the data in MPEG container formats along with timing data, then output the formatted data to the ME 120. The ME 120 may be responsible for initialization, playback, and other functions associated with content and may output that content to the application 114.

The application 114 may be a web browser or other application with an interface configured to download and present content. The application 114 may be coupled to the GUI 116 so that a user associated with the DASH client 108 may view the various functions of the application 114. In an embodiment, the application 114 may comprise a search bar so that the user may input a string of words to search for content. If the application 114 is a media player, then the application 114 may comprise a search bar so that the user may input a string of words to search for a movie. The application 114 may present a list of search hits, and the user may select the desired content (e.g., a movie) from among the hits. Upon selection, the application 114 may send instructions to the client DM 112 for downloading the content. The client DM 112 may download the content and process the content for outputting to the application 114. For example, the application 114 may provide instructions to the GUI 116 for the GUI 116 to display a progress bar showing the temporal progress of the content. The GUI 116 may be any GUI configured to display functions of the application 114 so that the user may operate the application 114. As described above, the GUI 116 may display the various functions of the application 114 so that the user may select content to download. The GUI 116 may then display the content for viewing by the user.

Figure 2:
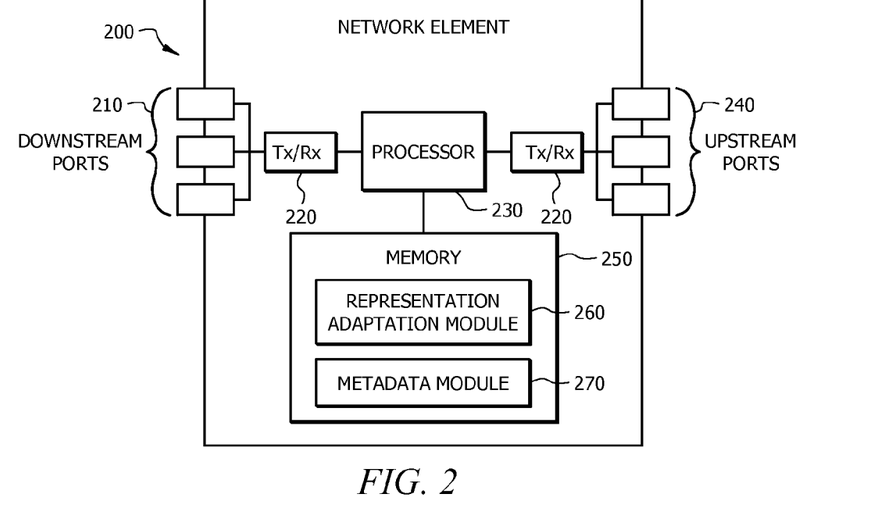
FIG. 2 is a schematic diagram of an embodiment of a network element.

FIG. 2 is a schematic diagram of an embodiment of a network element 200 that may be used to transport and process data traffic through at least a portion of a DASH system 100 shown in FIG. 1. At least some of the features/methods described in the disclosure may be implemented in a network element. For instance, the features/methods of the disclosure may be implemented in hardware, firmware, and/or software installed to run on the hardware. The network element 200 may be any device (e.g., a server, a client, a base station, a user-equipment, a mobile communications device, etc.) that transports data through a network, system, and/or domain. Moreover, the terms network "element," "node," "device," "component," "module," and/or similar terms may be interchangeably used to generally describe a network device and do not have a particular or special meaning unless otherwise specifically stated and/or claimed within the disclosure. In one embodiment, the network element 200 may be an apparatus configured to communicate quality information within metadata, to implement DASH, and/or to establish and communicate via an HTTP connection. For example, network element 200 may be, or incorporated with, an HTTP server 104 or a DASH client 108 as described in FIG. 1.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components. In another embodiment, the network element 200 may comprise one or more antennas coupled to the Tx/Rx 220. The Tx/Rx 220 may transmit and/or receive data (e.g., packets) from other network elements wirelessly via one or more antennas.

A processor 230 may be coupled to the Tx/Rx 220 and may be configured to process the frames and/or determine which nodes to send (e.g., transmit) the packets. In an embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to implement any of the adaptation schemes to communicate and/or signal metadata information.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the system and methods described herein. In one embodiment, the memory module 250 may comprise a representation adaptation module 260 or a metadata module 270 that may be implemented on the processor 230. In one embodiment, the representation adaptation module 260 may be implemented on a client to select representations for media content segments using quality information. In another embodiment, the metadata module 270 may be implemented on a server to communicate quality information and media content segments to one or more clients.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
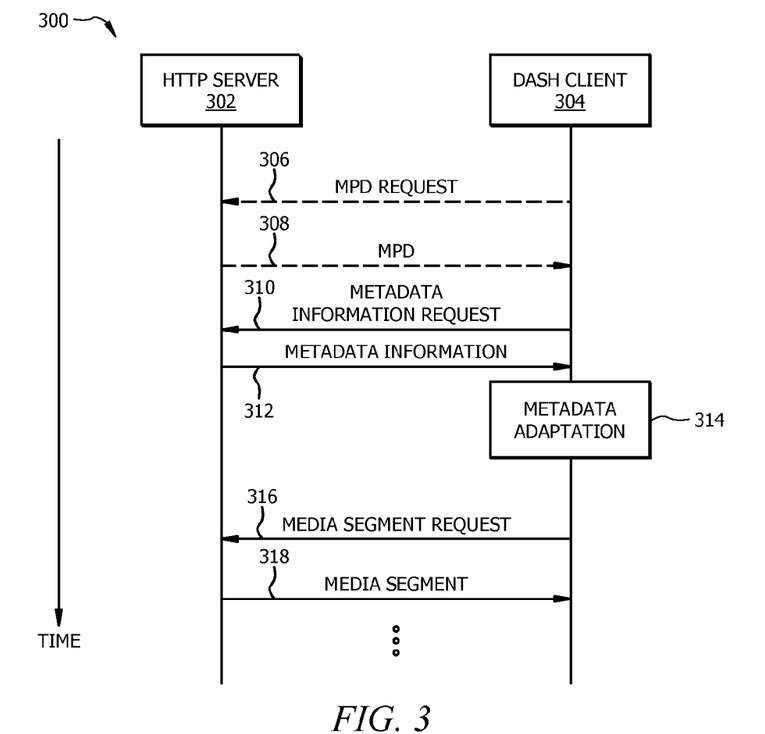
FIG. 3 is a protocol diagram of an embodiment of a DASH adaptation method.

FIG. 3 is a protocol diagram of an embodiment of a DASH adaptation method 300. In an embodiment, an HTTP server 302 may communicate data content with a DASH client 304. The HTTP server 302 may receive media content from a content source (e.g., content source 102 as described in FIG. 1) and/or may generate media content. For example, the HTTP server 302 may store media content in memory and/or a cache.

At step 306, the DASH client 304 may communicate an MPD by sending an MPD request to the HTTP server 302. The MPD request may comprise instructions for downloading, or receiving, segments of data content and metadata information from the HTTP server 302. At step 308, the HTTP server 302 may send an MPD to the DASH client 304 via HTTP. In other embodiments, the HTTP server 302 may deliver the MPD via HTTP secure (HTTPS), email, universal serial bus (USB) drives, broadcast, or any other type of data transport. Specifically in FIG. 3, the DASH client 304 may receive the MPD from the HTTP server 302 via the DAE (e.g., DAE 118 as described in FIG. 1), and the DAE may process the MPD in order to construct and/or issue requests from the HTTP server 302 for metadata content information and data content segments. Steps 306 and 308 may be optional and may be omitted in other embodiments.

At step 310, the DASH client 304 may send a metadata information request to the HTTP server 302. The metadata information request may be a request for a quality set, a quality segment, and/or quality information associated with one or more media segments, as will be discussed in FIG. 4. At step 312, in response to receiving the metadata information request, the HTTP server 302 may send metadata information to the DASH client 304.

The DASH client 304 may receive, process, and/or format the metadata information. At step 314, the DASH client 304 may use the metadata information to select the next representation and/or representation for streaming. The metadata information may comprise quality information. The DASH client 304 may use the quality information to select a representation level that maximizes the quality of experience for a user based on the quality information. A quality threshold may be determined and/or established by the DASH client 304 and/or an end-user. The end-user may determine a quality threshold based on performance requirements, subscriptions, interest in the content, and/or personal preferences. The DASH client 304 may select a media segment that corresponds to a quality segment that is greater than or equal to the quality threshold. Additionally, the DASH client 304 may also consider additional information (e.g., available bandwidth or bitrate) to select a media segment. For example, may also consider the amount of available bandwidth to deliver the desired media segment.

At step 316, the DASH client 304 may request a media segment from the HTTP server 302. For example, as instructed by the MPD and based on the received metadata information, the DASH client 604 may send a media segment request for a media segment to the HTTP server 302 via the DAE. The requested media segment may correspond with the representation level and/or adaption set determined using metadata information. At step 318, in response to receiving the media segment request, the HTTP server 302 may send a media segment to the DASH client 304. The DASH client 304 may receive, process, and/or format the media segment. For example, the media segment may be presented (e.g., visually and/or audibly) to a user. For example, after a buffering period, an application (e.g., application 114 as described in FIG. 1) may present the media segment for viewing via a GUI (e.g., GUI 116 as described in FIG. 1). The DASH client 304 may continue to send and/or receive metadata information and/or media segments to/from the HTTP server 302, similar to as previously disclosed with respect to steps 312-320.

Figure 4:
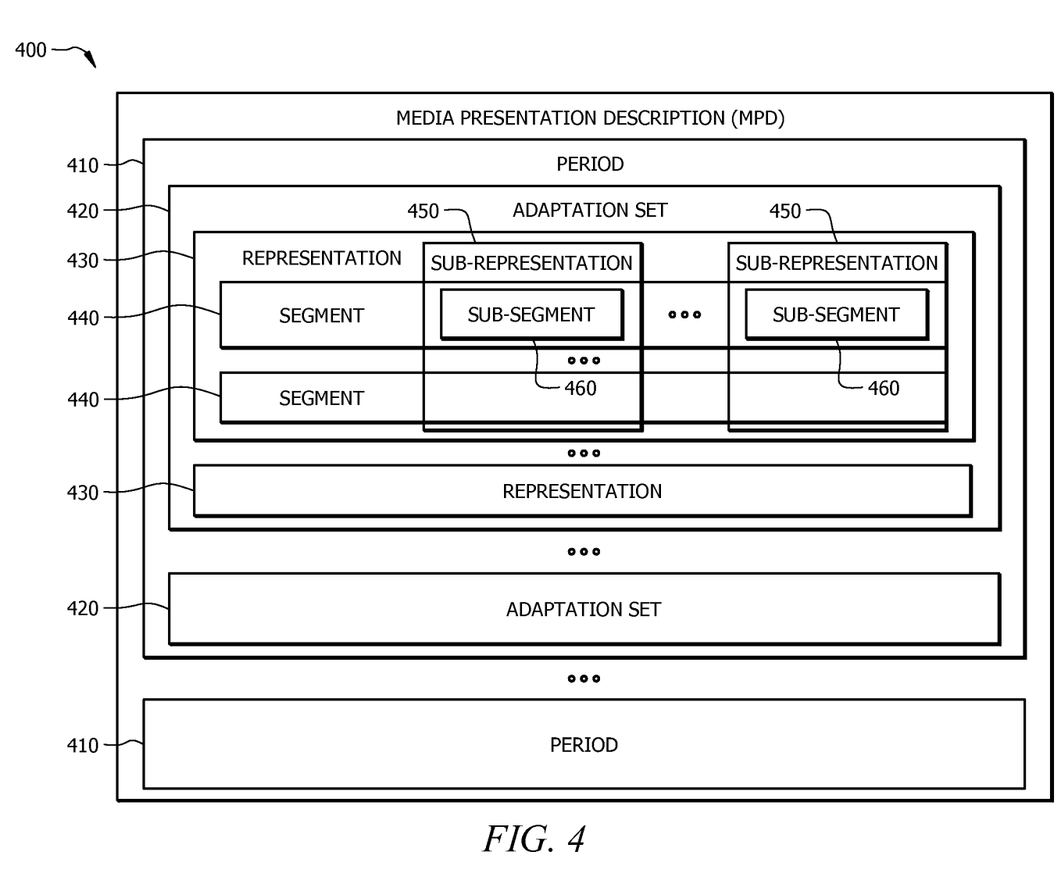
FIG. 4 is a schematic diagram of an embodiment of a media presentation description.

FIG. 4 is a schematic diagram of an embodiment of an MPD 400 for metadata information signaling. The MPD 400 may comprise quality information and performance information of the media content, such as minimum bandwidth, frame rate, audio sampling rate, and/or other bit rate information. In an embodiment, an HTTP server (e.g., HTTP server 104 as described in FIG. 1) may generate an MPD 400 to provide and/or enable metadata signaling. The MPD 400 is a hierarchical data model. In accordance with ISO/IEC 23009-1, the MPD 400 may be referred to as a formalized description for a media presentation for the purpose of providing a streaming service. A media presentation, in turn, may be referred to as a collection of data that establishes a presentation or media content. In particular, the MPD 400 may define formats to announce HTTP uniform resource locators (URLs), or network addresses, for downloading segments of data content. In one embodiment, the MPD 400 may be an Extensible Markup Language (XML) document. The MPD 400 may comprise a plurality of URLs, pointing to one or more HTTP servers for downloading segments of data and metadata information.

The MPD 400 may comprise Period 410, Adaptation Set 420. Representation 430, Segment 440, Sub-Representation 450, and Sub-Segment 460 elements. The Period 410 may be associated with a period of data content. In accordance with ISO/IEC 23009-1, the Period 410 may typically represent a media content period during which a consistent set of encoded versions of media content is available. In other words, the set of available bitrates, languages, captions, subtitles, etc. does not change during a period. An Adaptation Set 420 may comprise a set of mutually interchangeable Representations 430. A Representation 430 may describe a deliverable encoded version of one or more media content components. A plurality of temporally consecutive Segments 440 may form a stream or track of media content.

A DASH client (e.g., DASH client 108 as described in FIG. 1) may switch from representation to representation in order to adapt to network conditions or other factors. For example, the DASH client may determine if it can support a specific Representation 430 based on the metadata information associated with the Representation 430. If not, then the DASH client may select a different Representation 430 that can be supported. A Segment 440 may be referred to as a unit of data associated with a URL. In other words, a Segment 440 may generally be the largest unit of data that can be retrieved with a single HTTP request using a single URL. The DASH client may be configured to download each segment within the selected Representation 430 until the DASH client ceases downloading or until the DASH client selects another Representation 430. Additional details for the Segment 440, the Sub-Representation 450, and the Sub-Segment 460 elements are described in ISO/IEC 23009-1.

The Period 410, Adaptation Set 420, Representation 430, Segment 440, Sub-Representation 450, and Sub-Segment 460 elements may be used to reference various forms of data content. In an MPD, elements and attributes may be similar to those defined in XML 1.0, Fifth Edition, 2008, which is incorporated herein by reference as if reproduced in its entirety. Elements may be distinguished from attributes by uppercase first letters or camel-casing, as well as bold face, though bold face is removed herein. Each element may comprise one or more attributes, which may be properties that further define the element. Attributes may be distinguished by a proceeding '@' symbol. For example, the Period 410 may comprise a "@start" attribute that may specify when on a presentation timeline a period associated with the Period 410 begins.

For each period 410, one or more metadata sets may be available. For example, Table 1 comprises an embodiment of a list of metadata sets, such as the QualitySet, BitrateSet, and PowerSet. A metadata set may comprise a plurality of metadata representations. In Table 1, one of the metadata sets may be a QualitySet that comprises a plurality of quality representations, which are described in Table 2. Alternatively, one of the metadata sets may be a BitrateSet that comprises a plurality of bitrate representations or a PowerSet that comprises a plurality of power representations.

TABLE 1

An embodiment of semantics of a Period Element

| | | |
|---|---|---|
| Period | | Specifies the information of a Period. |
| ... | ... | ... |
| AdaptationSet | 0...N | Specifies an Adaptation Set. At least one Adaptation Set shall be present in each Period. However, the actual element may be present only in a remote element if xlink is in use, |
| QualitySet | 0...N | Specifies a Quality Set. A Quality Set is associated with an Adaptation Set with the same value of @id. |
| BitrateSet | 0...N | Specifies a Bitrate Set. A Bitrate Set is associated with an Adaptation Set with the same value of @id. |
| PowerSet | 0...N | Specifies a Power Set. A Power Set is associated with an Adaptation Set with the same value of @id. |

Legend:
For attributes: M = Mandatory, O = Optional, OD = Optional with Default Value, CM = Conditionally Mandatory.
For elements: <minOccurs>...<maxOccurs> (N = unbounded)
Note that the conditions only holds without using xlink:href. If linkng is used, then all attributes are "optional" and <minOccurs=0>
Elements are bold; attributes are non-bold and preceded with an @.

In Table 2, each of the metadata representations may be signaled together with one or more corresponding media representation. A metadata representation may comprise quality information about one or more media representations and may not comprise media data. As such, the metadata representation may be distinguished from a media representation. Each metadata representation may be associated with one or more media representation, for example, using a track-reference (e.g., a track-reference box 'cdsc'). A metadata representation may comprise a plurality of metadata segments. Each metadata segment may be associated with one or more media segments. The metadata segment may comprise quality information associated with the content of the media segments which may be considered during representation adaptation. A metadata segment may be divided into a plurality of subsegments. For example, a metadata segment may comprise index information that documents metadata information, as well as, access information for each of the subsegments.

TABLE 2

An embodiment of semantics of a QualitySet element

| Element or Attribute Name | Use | Description |
|---|---|---|
| QualitySet | | Adaptation Set description |
| @xlink:href | O | Specifies a reference to external AdaptationSet element |
| @xlink:actuate | OD default: 'onRequest' | Specifies the processing instructions, which can be either "onLoad" or "onRequest". |

TABLE 2-continued

An embodiment of semantics of a QualitySet element

| Element or Attribute Name | Use | Description |
|---|---|---|
| @id | O | Specifies an unique identifier for this Adaptation Set in the scope of the Period. The attribute shall be unique in the scope of the containing Period. The attribute shall not be present in a remote element. It should be of the same value as that of the Adaptation Set with which the Quality Set is associated. |
| BaseURL | 0 . . . N | Specifies a base URL that can be used for reference resolution and alternative URL selection. |
| SegmentBase | 0 . . . 1 | Specifies default Segment Base information. Information in this element may be overridden by information in the Representation.SegmentBase. |
| SegmentList | 0 . . . 1 | Specifies default Segment List information. Information in this element may be overridden by information in the Representation.SegmentList. |
| SegmentTemplate | 0 . . . 1 | Specifies default Segment Template information. Information in this element may be overridden by information in the Representation.SegmentTemplate. |
| Representation | 0 . . . N | Specifies a Representation. At least one Representation element shall be present in each Adaptation Set. The actual element may however be part of a remote element. |

In one embodiment, a quality representation may be located in the MPD 400 within an Adaptation Set 420 associated quality representation. A scheme for the quality representation may be indicated using metadata descriptions with a uniform resource name (URN) and/or by setting a @schemeIDUri value (e.g., urn:mpeg:dash:metadata:2013), as shown in Table 3. A Role element (e.g., Represent.Role) may be used in a metadata set to indicate the metadata type (e.g., quality, bitrate, or power). For example, Table 4 comprises an embodiment of a list of Role elements. Different Role values may be assigned for different metadata types.

TABLE 3

An embodiment of semantics of a QualityMetric element

| Element or Attribute Name | Use | Description |
|---|---|---|
| QualityMetric | | |
| @schemeIdUri | M | The scheme is identified by urn:mpeg:dash:quality_metric:2013. |
| @value | M | Indicates what metric is used to express quality. 1: PSNR 2: MOS 3. SSIM |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and proceeded with an @.

TABLE 4

An embodiment of various Role elements

| Role@value | Description |
|---|---|
| quality | Quality information of media data is provided in this representation |
| bitrate | Bitrate information of media data is provided in this representation |
| power | Power consumption information of media data is provided in this representation |

In another embodiment, the quality representation may be located in a new set, for example, a QualitySet. The QualitySet may reuse some of the elements and/or attributes defined for an Adaptation Set 420. The QualitySet may use an identifier (e.g., @id attribute) to link and/or reference the QualitySet to the adaptation set. For example, the QualitySet may associate with an Adaptation Set 420 by setting an @assocationId and/or an @associationType, as shown in Table 5. The quality representation may provide quality information for all the media representations in the adaptation set. The QualitySet may appear as a pair with the adaptation set for each period.

TABLE 5

An embodiment of semantics of a Representation Element

| | | |
|---|---|---|
| @associationId | O | Specifies all complementary Representations the Representation depends on in the decoding and/or presentation process as a whitespace-separated list of values of @id attributes. If not present, the Representation can be decoded and presented independently of any other Representation. This attribute shall not be present where there are no dependencies. |
| @associationType | O | Specifies the kind of dependency for each complementary Representation the Representation depends on that has been signaled with the @dependencyId attribute. Values taken by this attribute are the reference types registered for the track reference types at http://www.mp4ra.org/trackref.html. |

TABLE 5-continued

An embodiment of semantics of a Representation Element

If not present, it is assumed that the Representation depends on the complementary Representations for decoding and/or presentation process without more precise information. This attribute shall not be present when @dependencyId is not present.

A presentation may be contained in one or more files. A file may comprise the metadata for a whole presentation and may be formatted as described in ISO/IEC 14496-12 titled, "Information technology—Coding of audio-visual objects—Part 12: ISO base media file format," which is hereby incorporated by reference as if reproduced in its entirety. In one embodiment, the file may further comprise the media data for the presentation. An ISO-base media format file (BMFF) file may carry timed media information for a media presentation (e.g., a collection of media content) in a flexible and extensible format that may facilitate interchange, management, editing, and presentation of media content. Alternatively, a different file may comprise the media data for the presentation. A file may be an ISO file, an ISO-BMFF file, an image file, or other formats. For example, the media data may be a plurality of joint photographic experts group (JPEG) 2000 files. The file may comprise timing information, framing (e.g., position and size) information. The file may comprise media tracks (e.g., a video track, an audio track, and a caption track) and a metadata track. The tracks may be identified with a track identifier that uniquely identifies a track. The file may be structured as a sequence of objects and sub-objects (e.g., an object within another object). The objects may be referred to as container boxes. For example, a file may comprise a metadata box, a movie box, a media box, a segment box, and a track reference box. A media box may carry media data (e.g., video picture frames and/or audio) of a media presentation and a movie box may carry metadata of the presentation. A movie box may comprise a plurality of sub-boxes that carry metadata associated with the media data. For example, a movie box may comprise a video track box that carries descriptions of video data in the media box, an audio track box that carries descriptions of audio data in the media box, and a hint box that carries hints for streaming and/or playback of the video data and/or audio data. Additional details for a file and objects within the file may be as described in ISO/IEC 14496-12.

In one embodiment, metadata information may comprise information related to a quality of experience for a user. For example, metadata information may be quality information, bitrate information, or power consumption information. Quality information may refer to the coding quality of the media content. Quality of the encoded media data may be measured and represented in several granularity levels. Some examples of granularity levels may include a time interval of a sample, a track run (e.g., a collection of samples), a track fragment (e.g., a collection of track runs), a movie fragment (e.g., a collection of track fragments), and a sub-segment (e.g., a collection of movie fragments). A content producer may select a granularity level, compute quality metrics for a media content at the selected granularity level, and store the quality metrics on a content server. The quality information may be an objective measurement and/or a subjective measurement and may comprise peak signal-to-noise ratio (PSNR), mean opinion score (MOS), structural similarity (SSIM) index, frame significance (FSIG), mean signal error (MSE), multi-scale structural similarity index (MS-SSIM), perceptual evaluation of video quality (PEVQ), video quality metric (VQM), and/or any other quality metric as would be appreciated by one of ordinary skill in the art upon viewing this disclosure.

In one embodiment, quality information may be carried in a quality track in a media file, for example, in the header of the quality track box. A quality track may be described by a data structure that comprises parameters, such as a quality metric type, granularity level, and scale factor. Each sample in the quality track may comprise a quality value, where the quality value may be of the quality metric type. In addition, each sample may indicate a scale factor for the quality value, where the scale factor may be a multiplication factor that scales the range of the quality values. The quality track may also comprise metadata segment index boxes and the metadata segment index boxes may comprise a substantially similar structure as segment index boxes as defined in ISO/IEC 14496-12. Alternatively, the quality information may be carried as a metadata track as described in ISO/IEC 14496-12. For example, a video quality metric entry may be as shown in Table 6. The quality metric may be located in a structure (e.g., a description box QualityMetricsConfigurationsBox) that describes the quality metrics present during each sample and the field size used for each metric value. In Table 6, each sample is an array of quality values corresponding one for one to the declared metrics. Each value may be padded by a preceding zero bytes, as needed, to the number of bytes indicated by the variable field_size_bytes. In such an example, the variable accuracy may be a fixed point 14.2 number that indicates the precision of the sample in the sample box. Additionally, term "0x000001" in the condition statement may indicate the value accuracy (e.g., accurate to about 0.25). For a quality metric that is an integer value (e.g., MOS), the corresponding value may be 1 (e.g., 0x0008).

TABLE 6

An embodiment of a sample entry for a video quality metric

```
aligned(8) class QualityMetricsSampleEntry( )
    extends MetadataSampleEntry ('vqme')  {
    QualityMetricsConfigurationBox( );
}
aligned(8) class QualityMetricsConfigurationBox
    extends FullBox('vqmC', version=0, flags){
    unsigned int(8) field_size_bytes;
    unsigned int(8) metric_count;
    for (i = 1 ; i <= metric_count ; i++){
        unsigned int(32) metric_code;
        if (flags = 0x000001)
            unsigned int(16) accuracy;    //optional
    }
}
```

Table 7 is an embodiment of syntax for quality information. The variable metric_type may indicate a metric to express quality (e.g., 1:PSNR, 2:MOS, or 3:SSIM). In an embodiment, the box may be located in a segment structure (e.g., after a segment type box 'styp') or in movie structure (e.g., movie box 'moov').

TABLE 7

An embodiment of syntax for quality information

```
aligned(8) class SegmentIndexBox extends FullBox('qinf',
version = 0, 0) {
    unsigned int(4) metric_type
    unsigned int(28) reserved;
}
```

In another example, the metadata representation may be a power representation that comprises power consumption information about one or more Representations 430. For example, the power consumption information may provide information about the quality of a segment based on the available bandwidth, bandwidth consumption and/or power requirements. Additional details for metadata information metrics may be as described in ISO/IEC CD 23001-10 titled, "Information technology—MPEG systems technologies—Part 10: Carriage of Timed Metadata Metrics of Media in ISO Base Media File Format," which is hereby incorporated by reference as if reproduced in its entirety. The metadata information may be stored in the same (e.g., the same server) or in a different location (e.g., a different server) than the media content. That is, the MPD 400 may reference one or more locations for retrieving media content and metadata information.

Table 8 is an embodiment of syntax of a quality segment. For example, the syntax in Table 8 may be used when a quality segment is not divided into subsegments.

TABLE 8

An embodiment of syntax of a segment

```
aligned(8) class SegmentIndexBox extends FullBox('qdx2', version, 0) {
    unsigned int(32) reference_ID;
    unsigned int(16) quality_value;
    unsigned int(16) scale_factor;
}
```

Table 9 is an embodiment of syntax of a quality segment comprising subsegments. The variable quality_value may indicate the quality of the media data in the referenced subsegment. The variable scale_factor may control the precision of the quality_value. Additional syntax details may be as described in ISO/IEC JTC1/SC29/WG11/MPEG2013/m28168 titled, "In Band Signaling for Quality Driven Adaptation," which is here by incorporated by reference as if reproduced in its entirety.

TABLE 9

An embodiment of syntax of a segment comprising subsegments

```
aligned(8) class SegmentIndexBox extends FullBox('qdx1', version, 0) {
    unsigned int(32) reference_ID;
    unsigned int(32) timescale;
    if (version==0)
    {
        unsigned int(32) earliest_presentation_time;
        unsigned int(32) first_offset;
    }
    else
    {
        unsigned int(64) earliest_presentation_time;
        unsigned int(64) first_offset;
```

TABLE 9-continued

An embodiment of syntax of a segment comprising subsegments

```
    }
    unsigned int(16) reserved = 0;
    unsigned int(16) reference_count;
    for(i=1; i <= reference_count; i++)
    {
        bit (1)                          reference_type;
        unsigned int(31) referenced_size;
        unsigned int(32) subsegment_duration;
        bit(1)                           starts_with_SAP;
        unsigned int(3) SAP_type;
        unsigned int(28) SAP_delta_time;
        if(reference_type == 0)     //if media data is referenced
        {
            unsigned int(16) quality_value;
            unsigned int(16) scale_factor;
        }
    }
}
```

Figure 5:
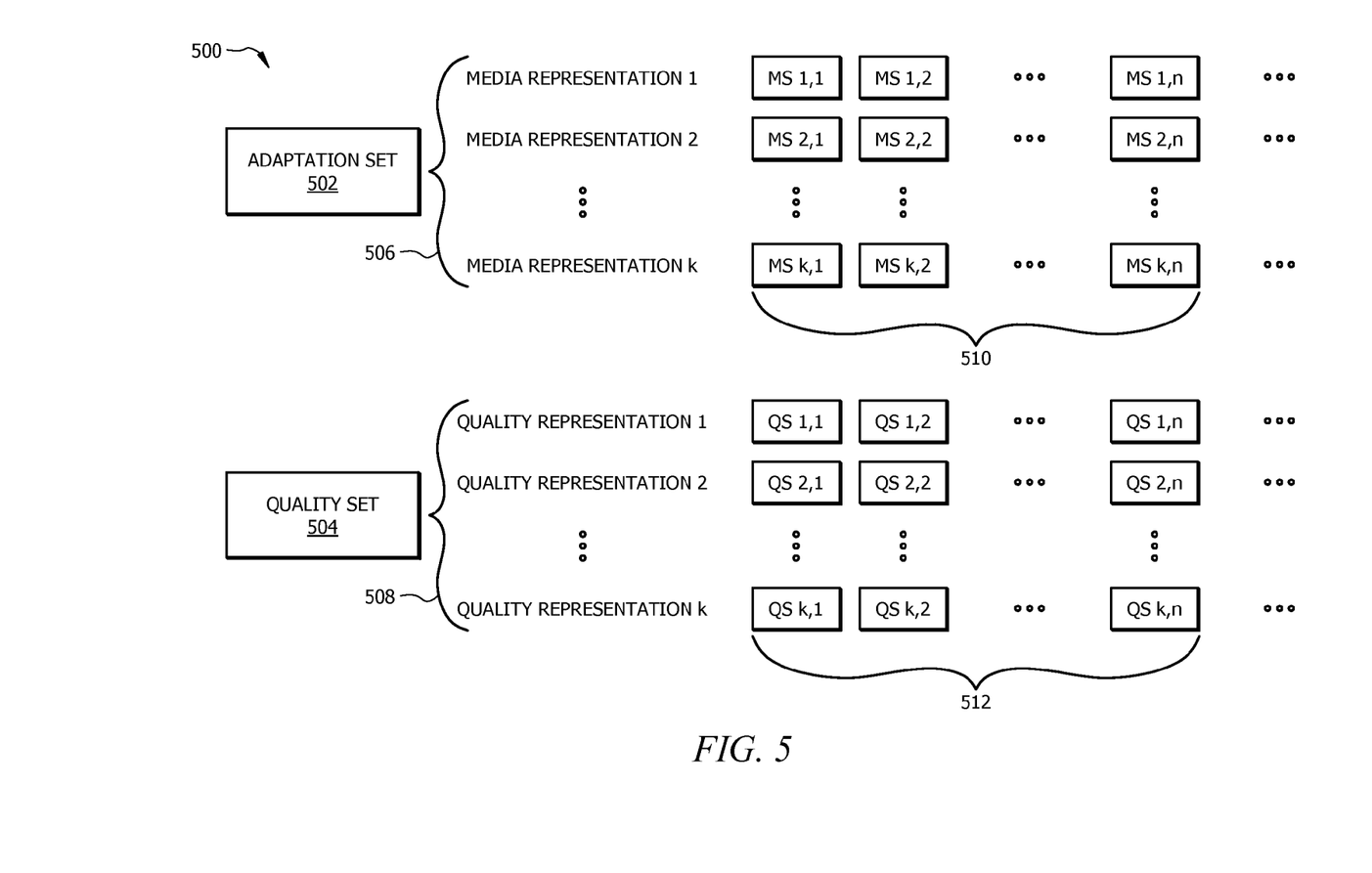
FIG. 5 is a schematic diagram of an embodiment of an adaption set association.

FIG. 5 is a schematic diagram of an embodiment of an adaption set association 500. An adaptation set association 500 may be implemented in an MPD (e.g., MPD 400 as described in FIG. 4) using an adaptation set and a metadata set, as previously discussed. In one embodiment, an Adaptation Set 502 may comprise an association to one or more other metadata sets (e.g., Quality Set, Bitrate Set, or Power Set). For example, an adaptation set association 500 may be an association between an Adaptation Set 502 and a Quality Set 504. The Adaptation Set 502 may comprise a plurality of media representations 506 that each comprises a plurality of media segments 510. The Quality Set 504 may comprise a plurality of quality representations 508 that each comprises a plurality of quality segments 512. In one embodiment, the association between the media segments 510 and the quality segments 512 may be a one-to-one association. Each media segment (MS) 1-$n$ in each media representation 1-$k$ may have a corresponding quality segment (QS) 1-$n$ in a corresponding quality representation 1-$k$. For example, a media segment 1,1 may correspond to a quality segment 1,1, a media segment 1,2 may correspond to a quality segment 1,2, and so on. Alternatively, a metadata segment may correspond to a plurality of media segments within a corresponding media representation. For example, a quality segment may correspond to a first half of the consecutive media segments in a media representation and a subsequent quality segment may correspond to a second half of the consecutive media segments in the media representation.

Figure 6:
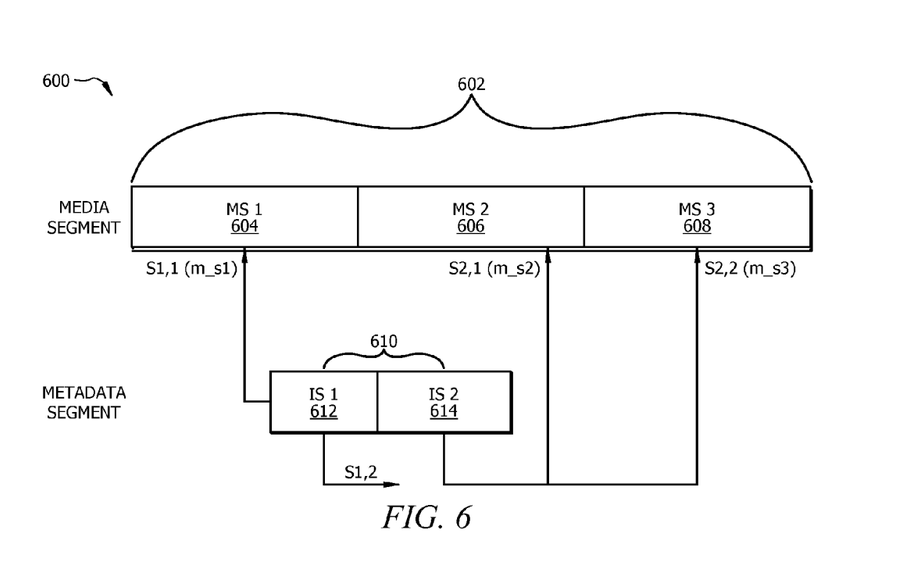
FIG. 6 is a schematic diagram of another embodiment of an adaption set association.

FIG. 6 is a schematic diagram of another embodiment of an adaption set association 600. In an embodiment, a metadata segment may be associated with one or more media sub-segments (e.g., Sub-Segments 460 as described in FIG. 4). In FIG. 6, a media segment 602 may comprise a plurality of media sub-segments 604-608. A metadata segment 610 may be associated with media sub-segments 604-608. The metadata segment 610 may comprise a plurality of segment boxes (e.g., segment index boxes 612 and 614) to document the media sub-segments 604-608. The segment index box 612 may document the media sub-segment 604 and the segment index box 614 may document the media sub-segments 606 and 608. For example, the segment index box 612 may use an index S1,1($m\_s1$) to reference the media sub-segment 604 and the segment index box 614 may use the indexes S2,1($m\_s2$) and S2,2($m\_s3$) to reference the media sub-segments 606 and 608, respectively.

Figure 7:
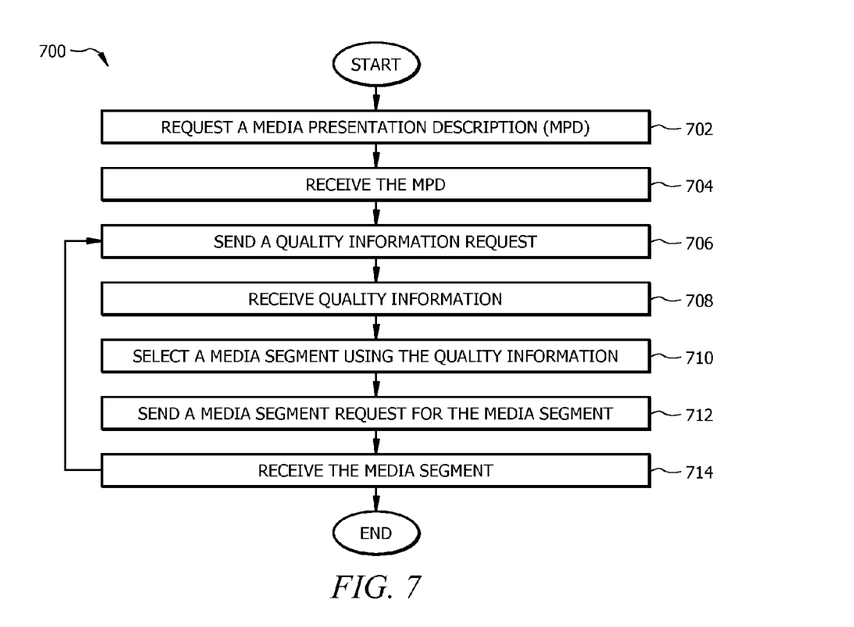
FIG. 7 is a flowchart of an embodiment of a representation adaptation method used by a DASH client.

FIG. 7 is a flowchart of an embodiment of a representation adaptation method 700. In an embodiment, the representation adaptation method 700 may be implemented on a client (e.g., DASH client 108 as described in FIG. 1) to select representations for media content segments using quality information. At step 702, method 700 may request an MPD that comprises instructions for downloading or receiving segments of data content and metadata information. At step 704, method 700 may receive the MPD. Steps 702 and 704 may be optional and in an embodiment may be omitted. At step 706, method 700 may send a quality information request. At step 708, method 700 may receive the quality information. At step 710, method 700 may select a media segment using the quality information. For example, method 700 may use an operation as described in step 316 of FIG. 3. At step 712, method 700 may send a media segment request that requests the media segment selected using the quality information. At step 714, method 700 may receive the media segment. Method 700 may continue to request and/or receive quality information and/or media segments, similar to as previously disclosed with respect to steps 706-714.

Figure 8:
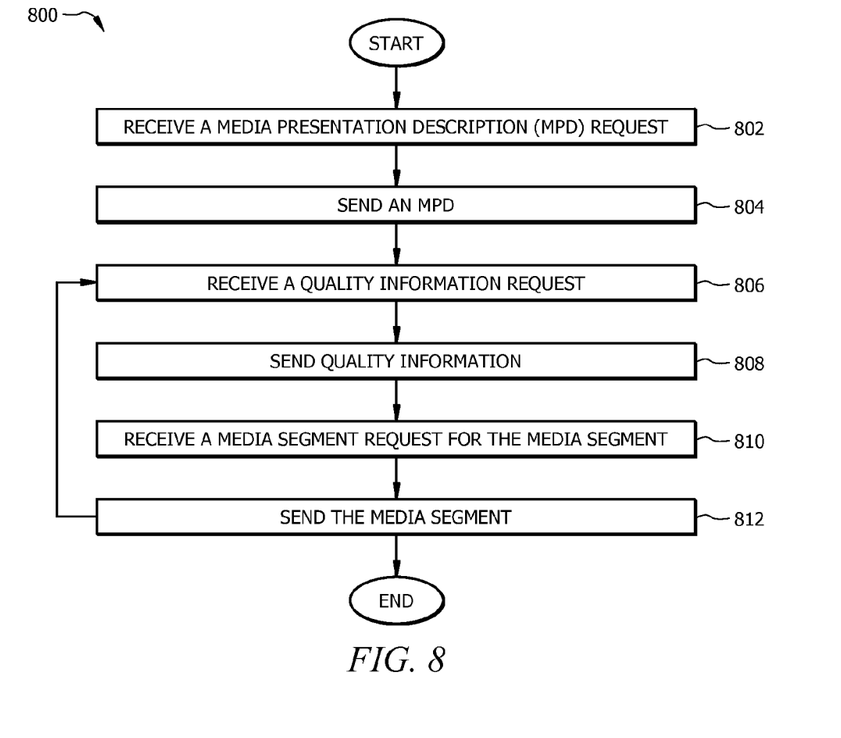
FIG. 8 is a flowchart of another embodiment of a representation adaptation method used by an HTTP server.

FIG. 8 is a flowchart of another embodiment of a representation adaptation method 800. In an embodiment, the representation adaptation method 800 may be implemented on an HTTP server (e.g., HTTP server 104 as described in FIG. 1) to communicate quality information and media content segments to one or more clients (e.g., DASH client 108 as described in FIG. 1). At step 802, method 800 may receive an MPD request for an MPD that comprises instructions for downloading or receiving segments of data content and metadata information. At step 804, method 800 may send the MPD. Steps 802 and 804 may be optional and may be omitted in other embodiments. At step 806, method 800 may receive a quality information request. At step 808, method 800 may send the quality information. At step 810, method 800 may receive a media segment request. At step 812, method 800 may send the requested media segment. Method 800 may continue to receive and/or send quality information and/or media segments, similar to as previously discussed with respect to steps 806-812.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A media representation adaptation method comprising:
requesting a media presentation description (MPD);
receiving the MPD in response to the requesting, wherein the MPD comprises information for retrieving a plurality of media segments and their metadata information;
sending a metadata information request in response to the MPD and in accordance with the information, wherein the metadata information request requests metadata information that corresponds to one or more of the media segments;
receiving the metadata information independently of receiving the MPD and in response to the metadata information request, wherein the metadata information comprises quality information, and wherein the quality information comprises at least one of a quality value, a bit rate, a size, and a duration;
selecting a first media segment from the media segments based on the metadata information;
sending a media segment request that requests the first media segment; and
receiving the first media segment in response to the media segment request.

2. The method of claim 1, further comprising retrieving bitrate information associated with the media segments.

3. The method of claim 1, further comprising using a Hypertext Transfer Protocol (HTTP) connection to send the metadata information request and to receive the metadata information.

4. The method of claim 1, wherein the metadata information can be accessed independent of the media segments.

5. The method of claim 1, wherein the metadata information comprises a plurality of metadata segments.

6. The method of claim 5, wherein the metadata information comprises a plurality of metadata segments with a one-to-one association with the media segments.

7. The method of claim 5, wherein one or more of the metadata segments are associated with one or more of the plurality of media segments.

8. The method of claim 5, further comprising deriving the metadata segments from a metadata representation, wherein the metadata representation is associated with a media representation that comprises the media segments.

9. The method of claim 1, wherein the metadata information further comprises power consumption information.

10. The method of claim 1, wherein the information comprises elements, attributes, or both elements and attributes.

11. The method of claim 1, wherein the metadata information comprises one or more metadata metrics of the media segments.

12. The method of claim 1, wherein the metadata information is time varying.

13. An apparatus comprising:
a memory; and
a processor coupled to the memory and configured to:
receive from a client a request for a media presentation description (MPD);
send the MPD to the client in response to the request, wherein the MPD comprises information for retrieving a plurality of media segments and their metadata information;
receive a metadata information request in response to the MPD and in accordance with the information, wherein the metadata information request requests metadata information that corresponds to one or more of the media segments;
send the metadata information independently of sending the MPD and in response to the metadata information request, wherein the metadata information comprises quality information, and wherein the quality information comprises at least one of a quality value, a bit rate, a size, and a duration;
receive a media segment request that requests a first media segment based on the metadata information; and
send the first media segment in response to the media segment request.

14. The apparatus of claim 13, wherein the metadata information comprises a plurality of metadata segments with a one-to-one correspondence with the plurality of media segments.

15. The apparatus of claim 13, wherein the metadata information comprises a plurality of metadata segments, and wherein each of the metadata segments corresponds with two or more of the media segments.

16. The apparatus of claim 13, wherein the metadata information further comprises bitrate information associated with the media segments.

17. The apparatus of claim 13, wherein the metadata information comprises one or more metadata metrics of the media segments.

18. A method for media representation adaption comprising:
requesting a media presentation description (MPD);
receiving the MPD in response to the requesting, the MPD comprises information for retrieving a plurality of timed metadata segments from one or more timed metadata representations;
sending a timed metadata segment request for one or more of the timed metadata segments in response to the MPD and in accordance with the information; and
receiving the timed metadata segment independently of receiving the MPD and in response to the time metadata segment request,
wherein the timed metadata segments comprise metadata information associated with one or more media segments,
wherein the metadata information comprises quality information, and
wherein the quality information comprises at least one of a quality value, a bit rate, a size, and a duration.

19. The method of claim 18, wherein the metadata information further comprises power consumption information.

20. The method of claim 18, wherein the timed metadata segments can be accessed independent of the media segments.

21. The method of claim 18, wherein the timed metadata segments have a one-to-one association with the media segments.

22. The method of claim 18, wherein one or more of the timed metadata segments are associated with one or more of the media segments.

23. The method of claim 18, wherein the timed metadata representations are associated with a second representation.

24. The method of claim 23, wherein the second representation is a media representation.

* * * * *

UNITED STATES PATENT AND TRADEMARK OFFICE
CERTIFICATE OF CORRECTION

PATENT NO. : 10,284,612 B2
APPLICATION NO. : 14/256607
DATED : May 7, 2019
INVENTOR(S) : Shaobo Zhang et al.

It is certified that error appears in the above-identified patent and that said Letters Patent is hereby corrected as shown below:

On the Title Page

Page 2, item [56], Other Publications, Column 1, Lines 4-7 should read:
"Information Technology – MPEG Systems Technologies – Part 10: Carriage of Timed Metadata of Media in ISO Base Media File Format," ISO/IEC JTC 1/SC 29 N, ISO/IEC CD 23001-10, ISO/IEC JTC 1/SC 29/WG 11, Jan. 17, 2014, 23 pages.

Signed and Sealed this
Twenty-fifth Day of June, 2019

Andrei Iancu
*Director of the United States Patent and Trademark Office*